(12) United States Patent
Lutz et al.

(10) Patent No.: US 9,925,506 B2
(45) Date of Patent: Mar. 27, 2018

(54) POURING SHIELD FOR A STAND MIXER

(71) Applicant: Whirlpool Corporation, Benton Harbor, MI (US)

(72) Inventors: Eric A. Lutz, Troy, OH (US); Joel G. Van Faasen, Holland, MI (US); Arren J. McCormick, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 193 days.

(21) Appl. No.: 14/702,978

(22) Filed: May 4, 2015

(65) Prior Publication Data

US 2016/0325250 A1   Nov. 10, 2016

(51) Int. Cl.
*B01F 15/00* (2006.01)
*A47J 43/07* (2006.01)
*A47J 43/044* (2006.01)

(52) U.S. Cl.
CPC ..... *B01F 15/00779* (2013.01); *A47J 43/0705* (2013.01); *A47J 2043/04454* (2013.01)

(58) Field of Classification Search
CPC . B01F 15/00779; B01F 7/161; A47J 43/0705; A47J 43/0727
See application file for complete search history.

(56) References Cited

U.S. PATENT DOCUMENTS

| 2,504,727 | A | 4/1950 | Post |
| 2,858,118 | A | 10/1958 | Perkins |
| 4,900,160 | A | 2/1990 | Brooks et al. |
| 5,207,506 | A | 5/1993 | Musseau et al. |
| 5,879,081 | A | 3/1999 | Chordia |
| 6,068,398 | A | 5/2000 | Lin |
| 6,176,610 | B1 | 1/2001 | Myers et al. |
| 6,827,481 | B2 | 12/2004 | Yoshioka |
| 7,384,187 | B2 | 6/2008 | Blackburn et al. |
| 7,543,980 | B2 | 6/2009 | Blackburn et al. |
| 8,147,126 | B2 | 4/2012 | Huang |
| 8,308,344 | B2 | 11/2012 | Short et al. |
| 2007/0091718 | A1* | 4/2007 | Browne .............. A47J 43/0727 366/347 |
| 2011/0063941 | A1* | 3/2011 | Seidler ................... A47J 36/06 366/145 |

FOREIGN PATENT DOCUMENTS

| EP | 1430824 A1 | 6/2004 |
| EP | 2265159 B1 | 10/2011 |
| WO | 2014198584 A1 | 12/2014 |

\* cited by examiner

*Primary Examiner* — Tony G Soohoo
*Assistant Examiner* — Elizabeth Insler
(74) *Attorney, Agent, or Firm* — Price Heneveld LLP

(57) ABSTRACT

A pouring shield for a stand mixer includes an upper collar for mounting to a mixer head of the stand mixer in a friction-fit manner without the need for clamps or other mounting accessories. The stand mixer is configured to receive a mixing bowl with an open top, and the pouring shield is configured to cover the open top of the mixing bowl at an upper rim of the mixing bowl using a seal member which is disposed around an outer perimeter of the pouring shield. The seal member is a flexibly resilient member configured to close the open top of the mixing bowl when the stand mixer is in a closed position, and includes a wide surface for accommodating mixing bowls of various sizes.

16 Claims, 5 Drawing Sheets

POURING SHIELD FOR A STAND MIXER

FIELD

The present disclosure relates to a pouring shield attachment, and more particularly, to an overmold pouring shield attachment as used in conjunction with a stand mixer.

BACKGROUND

When using a countertop stand mixer, a user will often use some form of a splash shield that is typically mounted on a mixing bowl to prevent the splashing of food particles out of the mixing bowl during a mixing procedure. In the past, pouring shields have been provided which include a pouring trough as an integral part of the pouring shield. Such pouring shields generally include a sufficiently large central opening to accommodate planetary action of an agitator shaft of certain mixers. This opening is often the source of food spills during a mixing procedure. Also, pouring shields of this configuration can only be used on bowls of a particular size, so that several sizes of pouring shields had to be provided in order to accommodate the variously sized bowls used with the mixer. An additional problem with such pouring shields has been that they are not easy to remove from the bowl when the bowl is mounted on a food mixer.

For that reason, it is desirable to provide a pouring shield for use with a stand mixer which is simple in construction, light in weight, economical to manufacture, easy to use, and which couples to the stand mixer so that the pouring shield better protects against spills and can be used with mixing bowls of various sizes.

SUMMARY

One aspect of the present disclosure includes a pouring shield for a stand mixer, wherein the stand mixer includes a mixer head and is configured to receive a mixing bowl with an open top. The pouring shield includes an upper collar which is configured to couple to the stand mixer. A body portion extends outwardly from the upper collar and includes an outer perimeter. A seal member is disposed along the outer perimeter of the body portion, and is a flexibly resilient member configured to close the open top of the mixing bowl when the stand mixer is in a closed position.

In another embodiment of the present disclosure, a pouring shield for a stand mixer, wherein the pouring shield includes a cover having a mounting boss and an outer perimeter with a body portion disposed therebetween. The mounting boss defines a mounting aperture and is configured to mount to the stand mixer. A seal member is disposed on the outer perimeter of the cover and is a flexibly resilient member to seal against a mixing bowl.

Yet, another aspect of the present disclosure includes a pouring shield for a stand mixer, wherein the pouring shield includes an upper collar defined by a mounting boss. A rubberized liner is disposed over the mounting boss. A body portion extends outwardly and downwardly from the upper collar and culminates in a substantially planar outer perimeter. A seal member is wrapped around the outer perimeter of the body portion. The seal member is a flexibly resilient member configured to seal against an open top of a mixing bowl of the stand mixer in assembly.

These and other features, advantages, and objects of the present device will be further understood and appreciated by those skilled in the art by reference to the following specification, claims, and appended drawings.

DETAILED DESCRIPTION

Figure 1:
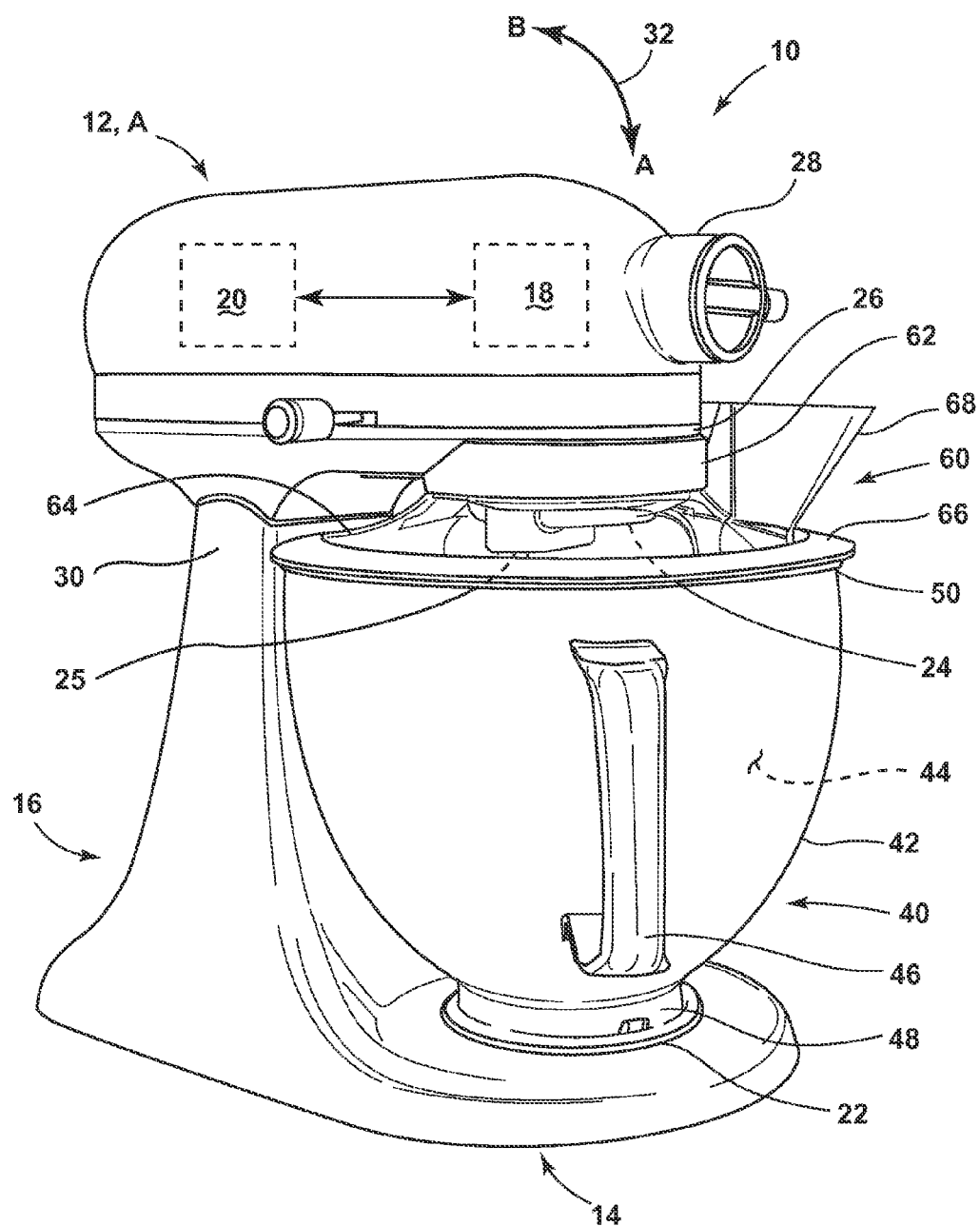
FIG. 1 is a front perspective view of a stand mixer having a pouring shield coupled to a mixer head in an in-use position according to one embodiment of the present disclosure.

For purposes of description herein, the terms "upper," "lower," "right," "left," "rear," "front," "vertical," "horizontal," and derivatives thereof shall relate to the device as oriented in FIG. 1. However, it is to be understood that the device may assume various alternative orientations except for expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, reference numeral 10 generally designates a countertop stand mixer appliance 10 (hereinafter "stand mixer"). The stand mixer 10 of FIG. 1 includes an articulating mixer head 12, a base 14, and an upstanding pedestal 16 extending upwardly from the base 14. The upstanding pedestal 16 supports the mixer head 12, which encases a motor 18 and associated electronic motor controls 20. The base 14 defines a landing for supporting a mixing vessel and further includes an engagement feature 22 for coupling to a mixing vessel, as further described below. The mixer head 12 includes a primary drive 24 with a drive shaft 25 having a hub 26 disposed therearound. The mixer head 12 further includes a secondary drive coupling hub 28 for coupling and powering an accessory of the stand mixer 10. Both the primary drive 24 and the secondary drive coupling hub 28 are powered by the motor 18 of the stand mixer 10.

Figure 2:
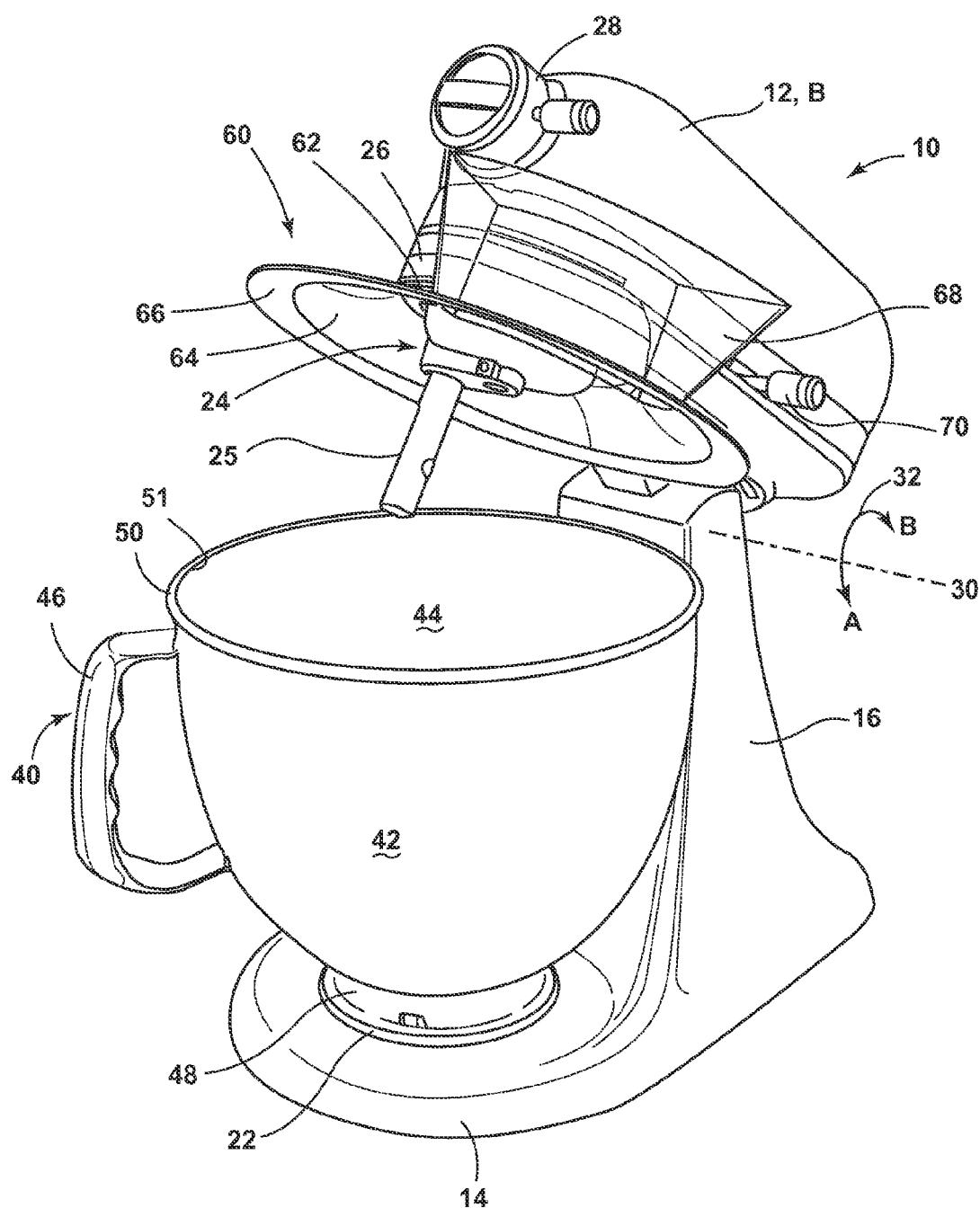
FIG. 2 is a front perspective view of the stand mixer and pouring shield of FIG. 1 with the mixer head in an open position.

As shown in FIG. 1, the stand mixer 10 is a tilt-head stand mixer, such as the KSM154 Stand Mixer available from KitchenAid® of St. Joseph, Mich. Thus, the mixer head 12 show in FIG. 1 is an articulating member configured to pivot between an operational or in-use position A (FIG. 1) and an open position B (FIG. 2) relative to the upstanding pedestal 16 at pivot point 30 along a path as indicated by arrow 32. In other embodiments, the stand mixer may be, for example, a bowl-lift stand mixer, such as the KP26 Stand Mixer, also available from KitchenAid® of St. Joseph, Mich. Both the tilt-head stand mixer and the bowl-lift stand mixer include operational and open positions, wherein a mixing bowl is accessible in the open position, and further wherein the mixer head and the mixing bowl are brought together for a mixing procedure in the operational or closed position. As used throughout this disclosure, the stand mixer 10 or the mixer head 12 may be referred to as being in an open or closed position. In the embodiments shown in this disclosure, the stand mixer 10 is in the open position B when the mixer head 12 is rotated upward as shown in FIG. 2. The stand mixer 10, in the disclosed embodiments, is in the closed position or operational position A when the mixer head 12 is rotated downwards towards a mixing bowl, as further described below. In the case of a bowl-lift stand mixer, the bowl-lift stand mixer is considered open when the mixing bowl is lowered away from the mixer head. The bowl-lift stand mixer is considered closed or in an operational position when the bowl is lifted towards the mixer head and ready for a mixing procedure.

As further shown in FIG. 1, the stand mixer 10 includes a mixing bowl 40 having a curved side wall 42 defining a receptacle portion 44 thereof. The illustrative mixing bowl 40 is contemplated to be made from stainless steel, glass, plastic or other suitable material. The mixing bowl 40 includes a handle 46 coupled to and outwardly extending from the side wall 42, and a base portion 48 which is configured to engage the engagement feature 22 of the base 14 of the stand mixer 10 to lock the mixing bowl 40 in place on the stand mixer 10 during a mixing procedure. The mixing bowl 40 further includes an upper rim 50 which opens into the receptacle portion 44. As shown in FIG. 1, with the mixer head 12 in the operational position A, the mixing bowl 40 is positioned directly below the primary drive 24 of the mixer head 12, such that the drive shaft 25 is received within the receptacle portion 44 of the mixing bowl 40. The drive shaft 25 extends downwardly from the primary drive 24 of the mixer head 12, as best shown in FIG. 2, for releasably coupling a mixer attachment thereto for mixing ingredients in the mixing bowl 40 as powered by the motor 18.

As further shown in FIG. 1, the stand mixer 10 includes a user control 52 which is illustratively embodied in FIG. 1 as a sliding speed control knob 52 mounted to a side of the mixer head 12. The user may choose a desired speed setting with the control knob 52, and the motor controls 20 will generally attempt to operate the motor 18 at the desired speed. It will be appreciated that in other embodiments the user control 52 may be any type of analog or digital user interface operable to input a desired speed setting for the stand mixer 10.

As further shown in FIG. 1, a pouring shield 60 of the present concept is coupled to the stand mixer 10. The pouring shield 60 is generally disposed between the upper rim 50 of the mixing bowl 40 and the mixer head 12 of the stand mixer 10 in FIG. 1. The pouring shield 60 includes an upper collar 62 that is releasably coupled to the hub 26 surrounding the primary drive 24 of the stand mixer 10, as further described below. A body portion 64 defines an angled guard or cover which extends downwardly and outwardly from the upper collar 62 in a conical manner. A seal member 66 is disposed around an outer perimeter 81 (FIG. 3) of the body portion 64 and is configured to abut or seal to the upper rim 50 of the mixing bowl 40 when the mixer head 12 is in the operational position A. In this way, the body portion 64 substantially covers the opening 51 (FIG. 2) of the mixing bowl 40 as defined by the upper rim 50. A feed chute or pouring trough 68 extends outwardly from and through the body portion 64, thereby providing access to the receptacle portion 44 of the mixing bowl 40 through the pouring shield 60. As coupled to the mixer head 12, the pouring shield 60 moves with the mixer head between open and closed positions, and does not impede the ability of the mixer head 12 to move to the closed position (FIG. 1) even when the pouring shield 60 is sealed against mixing bowl 40.

Referring now to FIG. 2, the mixer head 12 is shown in the open position B as pivoted from pivot point 30 relative to the upstanding pedestal 16 along the path as indicated by arrow 32. As shown in FIG. 2, with the mixer head 12 in the open position B, the pouring shield 60 has been moved away from the mixing bowl 40, as the pouring shield 60 pivots with the mixer head 12 as coupled thereto. With the mixer head 12 in the open position B and the pouring shield 60 coupled thereto, the receptacle portion 44 of the mixing bowl 40 is accessible for a user to introduce ingredients into the mixing bowl 40. Further, the drive shaft 25 of primary drive 24 is also accessible for attaching or removing mixing tools thereto. As further shown in FIG. 2, the mixer head 12 includes a lock mechanism 70 disposed on an opposite side of the mixer head 12 relative to the speed control knob 52, shown in FIG. 1. The lock mechanism 70 is configured to lock the mixer head 12 in the operational or closed position A, as shown in FIG. 1.

Figure 3:
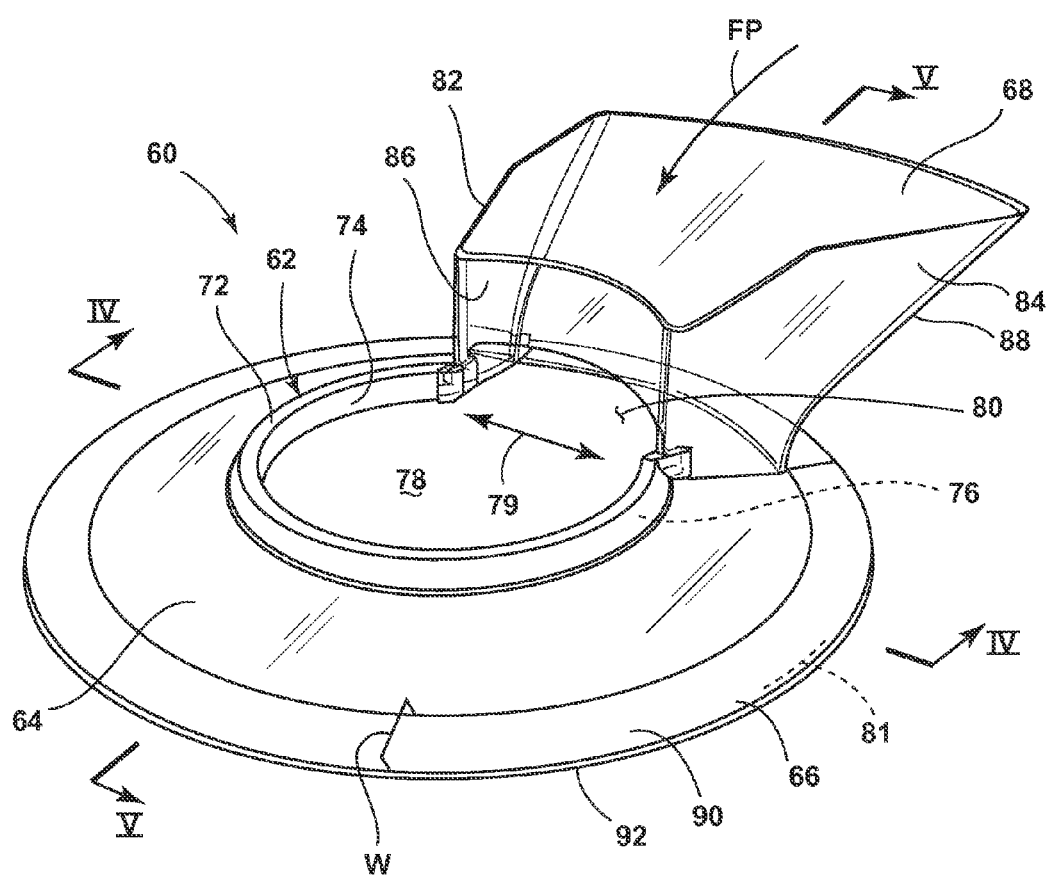
FIG. 3 is a rear perspective view of a pouring shield according to another embodiment of the present disclosure.

Referring now to FIG. 3, the pouring shield 60 is shown removed from the stand mixer 10 of FIGS. 1 and 2. As shown in FIG. 3, the body portion 64 and pouring trough 68 are contemplated to be comprised of a transparent material, such as a polymeric material. The upper collar 62 includes a rubberized liner 72 having an engagement side 74, wherein the engagement side 74 is configured to couple to the hub 26 of the mixer head 12 as shown in FIG. 1. The rubberized liner 72 is disposed on an upper mounting boss 76 of the body portion 64 which is generally circular and includes a configuration that conforms to the circular and flat sided configuration of the hub 26 of the stand mixer 10. In this way, the upper collar 62 is closely received on the hub 26 of the stand mixer 10 as shown in FIG. 1. With the rubberized liner 72, and the engagement side 74 thereof, the upper collar 62 is configured to friction-fit to the hub 26 of the stand mixer 10. In this way, the pouring shield 60 can easily be mounted on and removed from the stand mixer 10 by a user as needed without the need for extra clamp mechanisms or securing steps needed from the user. The mounting boss 76 and upper collar 62 generally define a mounting aperture 78 through which the hub 26 of the stand mixer 10 is received in assembly. The mounting aperture 78 is sized to accommodate the primary drive 24 of the stand mixer 10 and to further accommodate for planetary movement of the drive shaft 25 during a mixing procedure. The hub 26 of the stand mixer 10 is stationary, such that the pouring shield 60 will remain in place on the mixer head 12 and the mixing bowl 40 when the stand mixer 10 is in the closed position A as shown in FIG. 1. The rubberized liner 72 is contemplated to be flexibly resilient in order to grip the hub 26 of the stand mixer 10 in a secure friction-fit manner. Further, being flexibly resilient, the rubberized liner 72 does not add noise during the operation of the stand mixer 10 as the engagement side 74 of the rubberized liner 72 provides a flexible rubber buffer between mounting boss 76 and hub 26 of the stand mixer 10.

As further shown in FIG. 3, the pouring trough 68 includes sidewalls 82, 84, a curved rear wall 86 and an inclined front wall 88. In the configuration shown in FIG. 3, the pouring trough 68 defines a feed path FP, which opens into an opening 80 disposed through the body portion 64 of the pouring shield 60. In this way, ingredients can be added to a mixing bowl through the pouring shield 60 using the pouring trough 68. As shown in FIG. 3, the opening 80 is also in fluid communication with mounting aperture 78, such that the mounting boss 76 can flex slightly, as indicated by arrow 79, to allow the pouring shield 60 to mount to hub 26 of the stand mixer 10. The curved rear wall 86 of the pouring trough 68 is configured to closely follow the contours of the front of the mixer head 12 for better ensuring that ingredients are retained in a mixing bowl during a mixing procedure.

As further shown in FIG. 3, the body portion 64 of the pouring shield 60 culminates in an outermost perimeter 81 thereof, on which seal member 66 is disposed. The seal member 66 includes upper and lower sides 90, 92 and is configured to be an overmolded seal member that is flexibly resilient and coupled to the body portion 64. As shown in FIG. 3, the seal member 66 is a full uninterrupted circle disposed around the outer perimeter 81 of the body portion 64. With reference back to FIG. 1, the seal member 66 is shown disposed on and sealed against the entire circumference of upper rim 50 of mixing bowl 40. As described above, the upper rim 50 of the mixing bowl 40 defines an open top 51 (FIG. 2) to the receptacle portion 44 of the mixing bowl 40. Thus, with the stand mixer 10 in the closed or operational position A, the pouring shield 60 closes the open top 51 of the mixing bowl 40 around the entire circumference of the open top 51 defined by upper rim 50, and does not leave an opening at a rear portion thereof, as found in a number of known pouring shields. The seal member 66 is a flexibly resilient member contemplated to be made from rubber, foam or other like material. The seal member 66 seals down tightly to the upper rim 50 of the mixing bowl 40 to prevent ingredient splash out. Further, the seal member 66 has a width W, as further described below, making the seal member 66 an oversized seal member which can accommodate mixing bowls of various sizes, as further described below with reference to FIG. 6.

Figure 4:
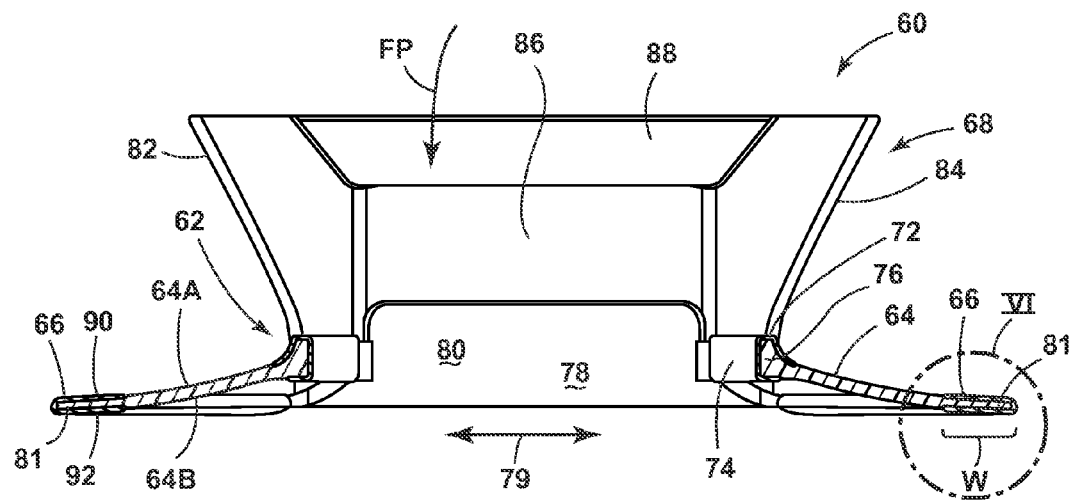
FIG. 4 is a cross-sectional side elevational view of the pouring shield of FIG. 3, taken at line IV.

Referring now to FIG. 4, a cross-sectional view of the pouring shield 60, as illustrated in FIG. 3, is shown. In the cross-sectional view of FIG. 4, the body portion 64 of the pouring shield 60 is shown to be an angled body portion extending from mounting boss 76 to the outer perimeter 81, wherein the body portion 64 further includes an upper side 64A and a lower side 64B. In FIG. 4, the body portion 64 is shown as a unitary member from mounting the boss 76 to the outer perimeter 81. The upper and lower sides 90, 92 of the seal member 66 are shown disposed on the upper and lower sides 64A, 64B of the body portion 64 at the outer perimeter 81 thereof. Thus, it is contemplated that the seal member 66 is a unitary member which wraps around the outer perimeter 81 of the body portion 64 and defines a full circle or complete ring around the body portion 64. The outer perimeter 81 can be an angled member, or can be a substantially planar portion of the body portion 64. As further shown in FIG. 4, the engagement side 74 of the liner 72 is disposed directly adjacent to the mounting aperture 78. With the mounting aperture 78 opening into opening 80 of the pouring trough 68, the upper collar 62 is configured to flex outwardly in a directional as indicated by arrow 79 to accommodate the coupling of the upper collar 62 in a friction-fit manner to the hub 26 of the stand mixer 10. The pouring shield 60 is a generally rigid member contemplated to be comprised of a transparent polymeric material for the pouring trough 68 and the body portion 64 which can be molded as a complete unitary member. Although the pouring shield 60 is generally rigid, the configuration of the pouring shield 60 allows for some flex at mounting aperture 78 for mounting the upper collar 62 to the mixer head 12 of the stand mixer 10 at hub 26. The liner 72, as noted above, is rubberized, such that the engagement side 74 of the liner 72 provides a friction-fit to the hub 26 of the stand mixer 10 to securely mount the pouring shield 60 to the stand mixer 10, even when the mixer head 12 articulates between open and closed positions and during a mixing procedure, or while adding ingredients using the pouring trough 68. Further, as noted above, the seal member 66 is also contemplated to be a resiliently flexible foam-like member which is configured to seal to an upper rim, such as upper rim 50 of mixing bowl 40, when the pouring shield 60 is moved to the closed position A via the mixer head 12. The resiliency of the seal member 66 and the oversized width W of the seal member 66 allow for the pouring shield 60 to close off or seal against a number of mixing bowls having various circumferences (sizes) and upper rim configurations, as further described below with reference to FIG. 6.

Figure 5:
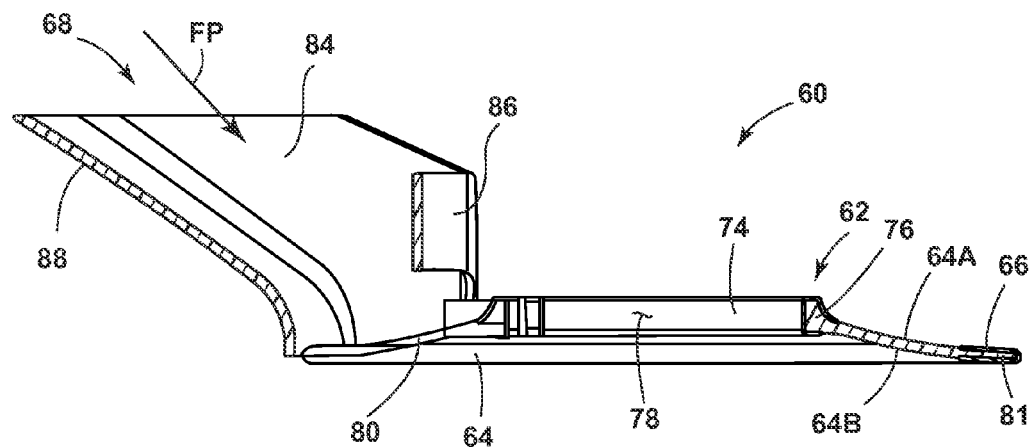
FIG. 5 is a cross-sectional side elevational view of the pouring shield of FIG. 3, taken at line V.

Referring now to FIG. 5, another cross-sectional view of the pouring shield 60 illustrated in FIG. 3 is shown. The embodiment of FIG. 5 illustrates a cross-sectional view of the mounting boss 76 and outer perimeter 81 of body portion 64 of the pouring shield 60. Liner 72 is shown wrapped around an entirety of the mounting boss 76 to define an engagement side 74 disposed adjacent to mounting aperture 78. Again, the seal member 66 is shown wrapped around both the upper and lower sides 64A, 64B of the body portion 64 at outer perimeter 81.

Figure 6:
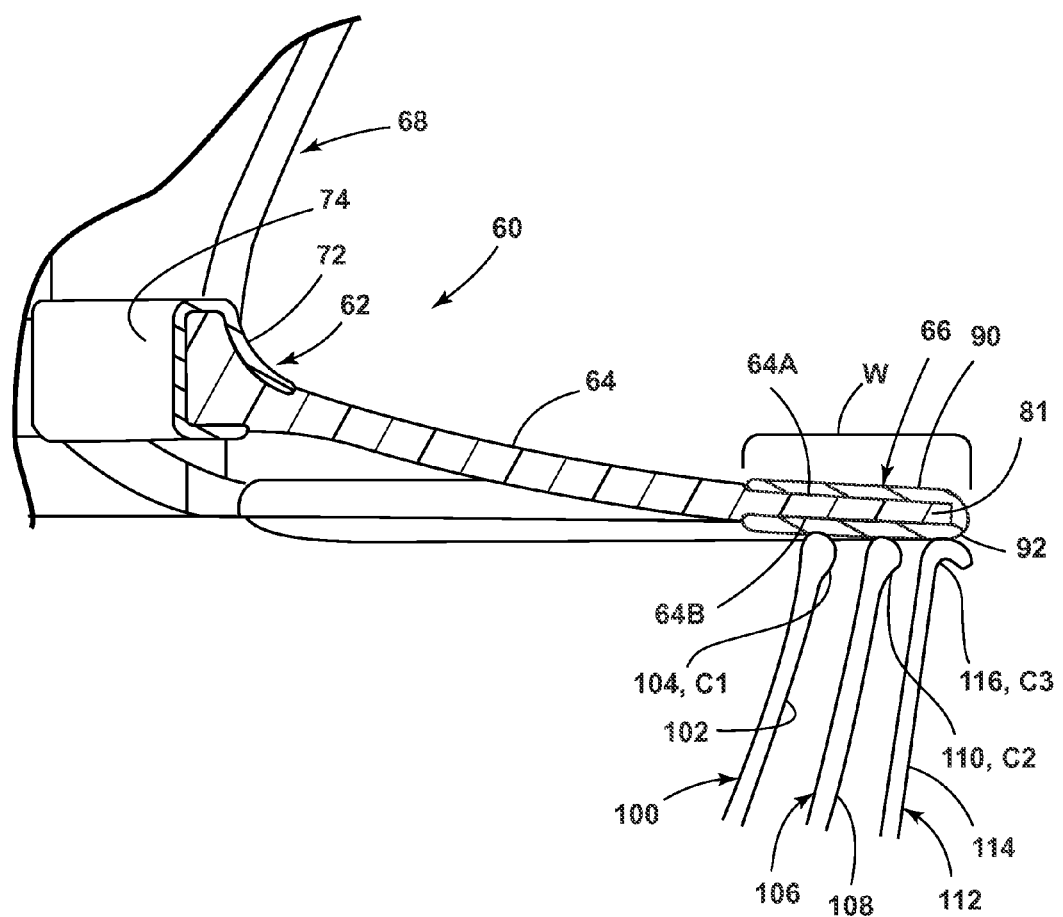
FIG. 6 is a cross-sectional side elevational view of the pouring shield of FIG. 4, taken at location VI.

Referring now to FIG. 6, the pouring shield 60 is shown in a zoomed in area as indicated by area VI in FIG. 4. As shown in FIG. 6, the pouring shield 60 is shown disposed on or covering various sized mixing bowls indicated by reference numerals 100, 106 and 112. The mixing bowls 100, 106 and 112 are contemplated to be akin to the mixing bowl 40 shown in FIGS. 1 and 2, in that they have similar parts, but different configurations and sizes. Specifically, mixing bowl 100 includes a side wall 102 which culminates in an upper rim 104. The upper rim 104 of mixing bowl 100 defines a first circumference C1 of mixing bowl 100. As shown in FIG. 6, the upper rim 104 of mixing bowl 100 is contemplated to be a roll-formed upper rim commonly known in the art. Mixing bowl 106 similarly includes a side wall 108 which culminates in an upper rim 110 to define a second circumference C2 which is larger than the first circumference C1 of mixing bowl 100. The upper rim 110 of mixing bowl 108 is also shown to be a roll-formed upper rim. Referring now to mixing bowl 112, a side wall 114 culminates in an upper rim 116 to define a third circumference C3 which is larger than both the first and second circumferences C1, C2 of mixing bowls 100, 106. The upper rim 116 of mixing bowl 112 is shown as a flared upper rim, which is also known in the art. The mixing bowls 100, 106 and 112 are shown in FIG. 6 as illustrated examples of various types of mixing bowls that can be used with the pouring shield 60 of the present concept. While the mixing bowls 100, 106 and 112 have varying sizes or circumferences C1-C3, respectively, the seal member 66 of the pouring shield 60 is able to accommodate the various sized mixing bowls 100, 106 and 112 given the width W of the seal member 66 defining a large or wide sealing surface 92. In this way, the pouring shield 60 of the present concept can be mounted to a stand mixer, such as stand mixer 10 shown in FIGS. 1 and 2, and accommodate various sized mixing bowls, such as mixing bowl 40, 100, 106, and 112, such that a multitude of pouring shields specifically tailored for a specific mixing bowl size is not necessary.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

What is claimed is:

1. A pouring shield for a stand mixer, wherein the stand mixer includes a mixer head and is configured to receive a mixing bowl with an open top, the pouring shield comprising:
    an upper collar configured to couple to the stand mixer;
    a body portion extending outwardly from the upper collar, and having a circular outer perimeter; a seal member coupled to an underside of the outer perimeter of the body portion, wherein the seal member is a flexibly resilient member configured in a full circle around the underside of the outer perimeter to close the open top of the mixing bowl; and wherein the outer perimeter further includes an upper side and a distal edge, and further wherein the seal member includes upper and lower sides wrapped around the distal edge of the outer perimeter of the body portion, such that the upper side of the seal member is disposed on the upper side of the outer perimeter and the lower side of the seal member is disposed on the underside of the outer perimeter.

2. The pouring shield of claim 1, wherein the upper collar is defined by a mounting boss.

3. The pouring shield of claim 2, including:
    a rubberized liner disposed over the mounting boss.

4. The pouring shield of claim 3, wherein the upper collar is configured to couple to the stand mixer in a friction-fit manner.

5. The pouring shield of claim 1, wherein the upper collar is configured to couple to the mixer head of the stand mixer.

6. The pouring shield of claim 1, wherein the seal member includes a width configured to accommodate mixing bowls of various sizes.

7. The pouring shield of claim 1, including:
    a pouring trough disposed on the body portion.

8. A pouring shield for a stand mixer, comprising:
    a cover having a mounting boss and an outer perimeter with a body portion disposed therebetween,
    wherein the mounting boss is configured to mount to the stand mixer; a seal member coupled to an underside of the outer perimeter of the cover, wherein the seal member is a flexibly resilient member, and further wherein the seal member is configured in a full uninterrupted circle disposed around the outer perimeter along the underside thereof; and wherein the outer perimeter further includes an upper side and a distal edge, and further wherein the seal member includes upper and lower sides wrapped around the distal edge of the outer perimeter of the body portion, such that the upper side of the seal member is disposed on the upper side of the outer perimeter and the lower side of the seal member is disposed on the underside of the outer perimeter.

9. The pouring shield of claim 8, including:
    a liner disposed over the mounting boss, the liner having an engagement side.

10. The pouring shield of claim 9, wherein the mounting boss is configured to couple to a mixer head of the stand mixer in a friction-fit manner.

11. The pouring shield of claim 10, wherein the mounting boss defines a mounting aperture for receiving a hub of the mixer head.

12. A pouring shield for a stand mixer, comprising:
    an upper collar defined by a mounting boss and having a rubberized liner disposed over the mounting boss;
    a body portion extending outwardly and downwardly from the upper collar, the body portion culminating in an outer perimeter having an upper side and an underside with a distal edge disposed therebetween; and
    a seal member wrapped around the distal edge of the outer perimeter of the body portion, wherein the seal member includes an upper side outwardly extending from the upper side of the outer perimeter and a lower side outwardly extending from the underside of the outer perimeter.

13. The pouring shield of claim 12, wherein the mounting boss is configured to couple to a mixer head of the stand mixer in a friction-fit manner.

14. The pouring shield of claim 12, wherein the seal member is a flexibly resilient member.

15. The pouring shield of claim 14, wherein the seal member is comprised of a foam material that is different from a material composition of the outer perimeter.

16. The pouring shield of claim 12, including:
    a pouring trough disposed through the body portion.

* * * * *